Aug. 23, 1938.  W. E. TINGLE  2,127,895

PARACHUTE

Filed Nov. 11, 1936

Inventor

W. E. Tingle.

By Munn, Anderson & Liddy
Attorney

Patented Aug. 23, 1938

2,127,895

UNITED STATES PATENT OFFICE 2,127,895

PARACHUTE

William E. Tingle, Butte, Nebr.

Application November 11, 1936, Serial No. 110,337

1 Claim. (Cl. 244—152)

This invention relates to improvements in parachutes, and its objects are as follow:

First, to provide a parachute which can be closed and reopened at will while the jumper is in transit in the air.

Second, to provide a parachute which can be made to collapse quickly after the jumper has reached the ground, thereby avoiding his being dragged, especially when the landing is made in a high wind.

Third, to provide an attachment for any known type of parachute, which works like a valve to produce the functions stated above.

Other objects and advantages will appear in the following specification, reference being had to the accompanying drawing, in which.

Figure 1:
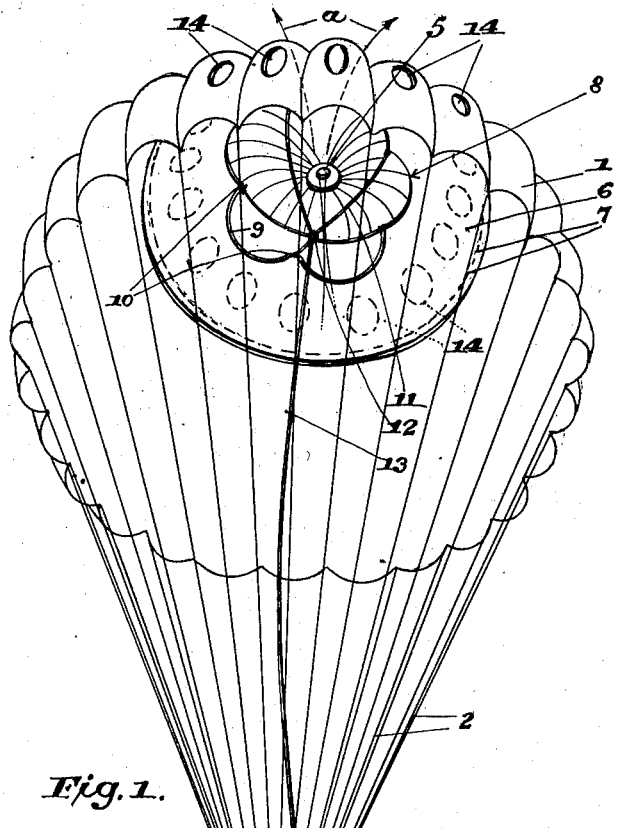
Figure 1 is a perspective view of the improved parachute.

The parachute of known construction is designated 1. It is immaterial what the type of this parachute may be, it being identified as being of a more or less conventional style in that the suspension cords 2 converge at a harness 3 in which the jumper 4 is strapped. The parachute 1 has the usual air-hole 5, through which a stream of air escapes (arrows a, Fig. 1) while the jumper is in transit in the air.

Figure 3:
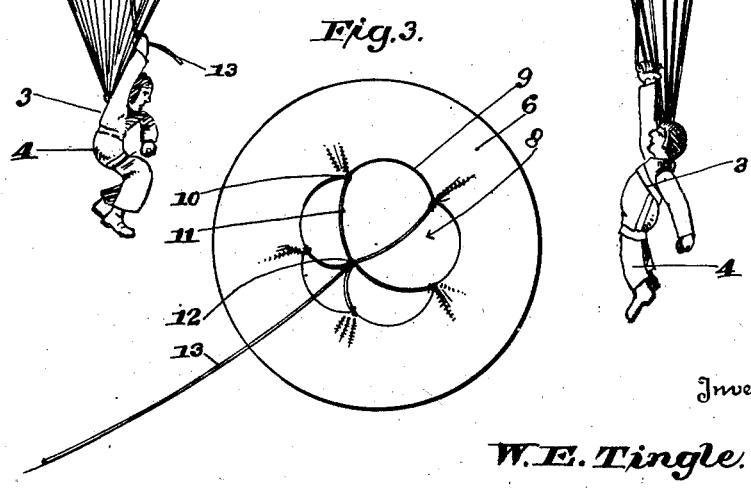
Figure 3 is a detailed perspective view of the attachment.

The invention comprises a silk or other fabric flap 6 which is sewed at its outer circular margin to the upper inside half of the parachute as close to the top as possible or needed, as indicated at 7 (Fig. 1). The preferred type of flap is the circular form illustrated in Fig. 3. This flap acts as a valve as presently appears. It is made in substantial ring form, the center being open at 8.

The inner scalloped margin 9 of the flap has a plurality of crests 10 which comprise places of attachment of as many silk or other cords 11 which ordinarily hang loose (Figs. 1 and 3) but are all tied together in the center as at 12. It is from there that one strong silk or other cord 13 extends down to the jumper's harness (Fig. 1) hanging directly down the center of the parachute and the system of converging cords 2.

Another and necessary phase of the invention is the circular series of holes 14 which is cut into the parachute 1 at a place adjacent to its crown, and in such locations with reference to the attached flap 6 (Fig. 1) that said holes will be covered by the flap by the upward air pressure. It is not until the jumper pulls downward on the cord 13 (Fig. 2) that the flap 6 is pulled away from the holes. This lets a large volume of air through the holes so that the parachute closes. It is in this manner that the flap acts as a valve.

When the parachute is in full bloom, to use an expression common to aviators, it will function as any known parachute, the series of holes 14 being closed by the circular flap 6. As already indicated, the latter is secured to the parachute only around its outer margin, the inner margin being free. Now should the jumper desire to close the parachute, he has only to put his weight on the cord 13. The amount of closure of the parachute is controlled by the amount and direction of pull on the cord because it is upon the latter that the extent of opening of the flap 6 depends.

It is possible to guide the parachute in descending by pulling downwardly on the cord 13 but laterally in the direction in which it is desired to drift.

Figure 2:
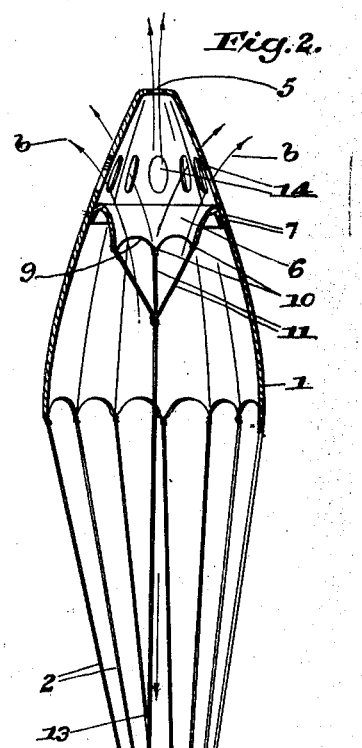
Figure 2 is a vertical section of the parachute showing how it can be closed while the jumper is in transit in the air.

Large volumes of air escape through the holes 14 (arrows b, Fig. 2). This arrangement is of special advantage in landing. It is not an uncommon experience for a jumper to be dragged for considerable distances over the ground when landing in a wind. This can be avoided by the use of the attachment by pulling on the cord 13 as soon as the landing is made, thereby causing the parachute to collapse. Thus, it is the main purpose of the invention to enable the opening and closing of a parachute anywhere in the air or on the ground when landing.

I claim:

A parachute which includes suspension cords converging to a point of attachment to a harness, said parachute having a circular series of holes near the crown, an unfettered imperforate and continuous fabric ring which is scalloped on its inner margin, said ring being annularly secured to the parachute at its outer margin below the holes, and a pull cord having plural cords branching from its upper end to points of connection with the crests of the scallops, its lower end hanging near the harness.

WILLIAM E. TINGLE.